United States Patent [19]

Caballero et al.

[11] 4,405,588
[45] Sep. 20, 1983

[54] PROCESS OF REMOVING IRON IMPURITIES FROM ORES

[75] Inventors: Alejandro J. Caballero; Ricardo I. Holcombe, both of Monterrey, Mexico

[73] Assignee: Materias Primas, Monterrey, S.A., Col. Obispado, Mexico

[21] Appl. No.: 333,256

[22] Filed: Dec. 21, 1981

[51] Int. Cl.³ .............................................. C01B 33/12
[52] U.S. Cl. .................................... 423/340; 423/131; 423/132; 423/150; 106/DIG. 8
[58] Field of Search ............... 423/340, 131, 132, 150; 501/31, 146, 147; 106/DIG. 8; 241/DIG. 10

[56] References Cited

U.S. PATENT DOCUMENTS 1,840,338 10/1927 Trautmann .......................... 423/340
1,957,579 12/1931 Carew ................................. 423/340

FOREIGN PATENT DOCUMENTS 634479 11/1977 United Kingdom ................ 423/340

OTHER PUBLICATIONS

Dasher, John et al. "New Methods of Cleaning Glass Sands" The Bulletin of the American Ceramic Society, vol. 20, No. 6 Jun. 1941, pp. 187–195. Messner William E., "Scrubbing Solves Sand Floation Problem" Mining Engineering vol. 7, No. 2, Feb. 1955, p. 1955.

Primary Examiner—O. R. Vertiz
Assistant Examiner—Jackson Leeds
Attorney, Agent, or Firm—Darby & Darby

[57] ABSTRACT

A process of removing iron impurities from ores, particularly useful for removing stains of iron impurities adhered to silica sand particles, comprises grinding the ore, washing and desliming the ground ore to remove the major part of the clay-type binder, attrition-scrubbing the deslimed particles to release further amounts of binder therefrom, washing and desliming to remove said binder, drying and heating the ore particles, treating the hot particles with a chemical agent suitable to conver the iron impurities into water soluble iron compounds, attrition-scrubbing the hot suspension of chemically treated particles to release the stains of iron impurities, and washing with cold water and desliming to recover the purified ore particles.

8 Claims, 1 Drawing Figure

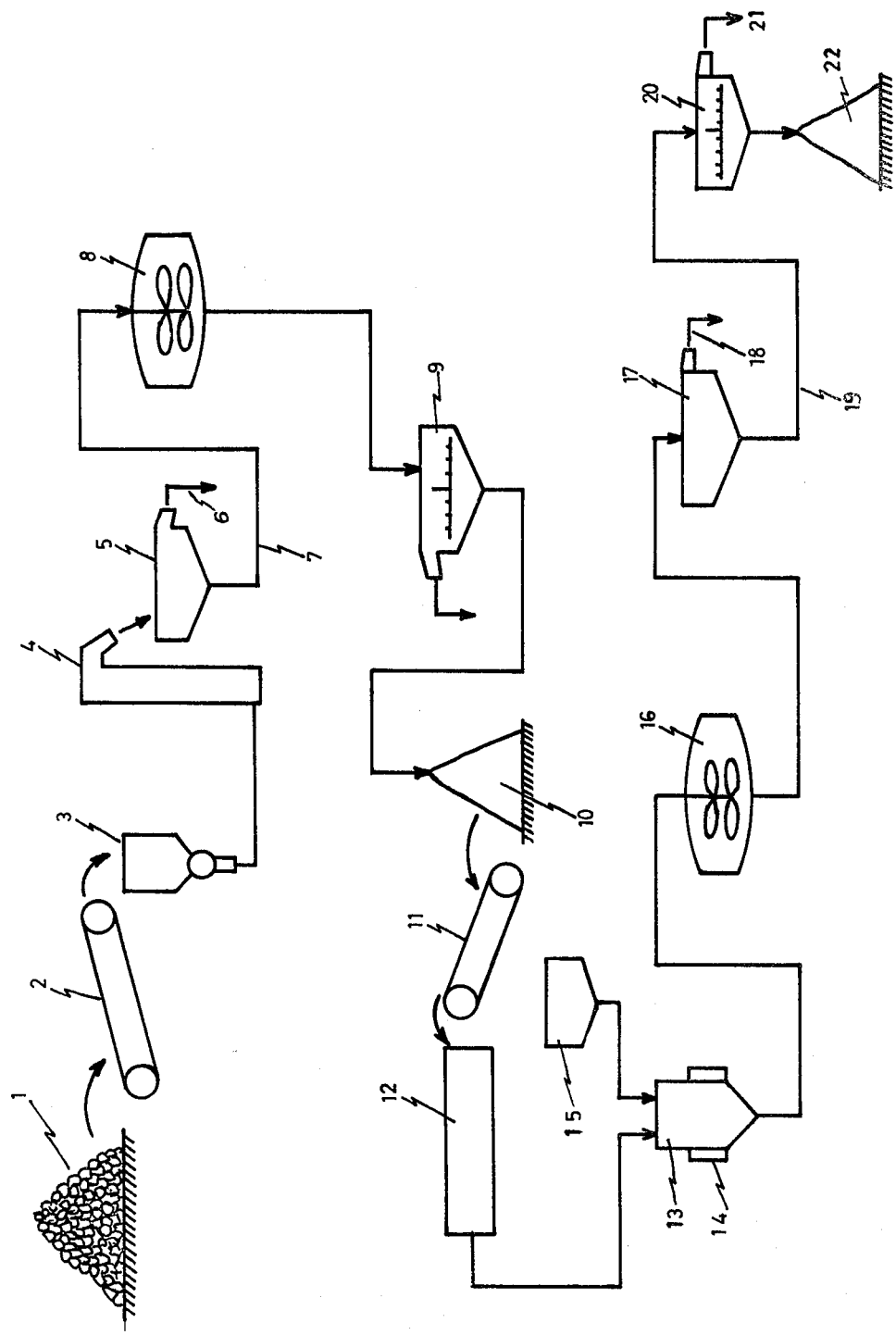

PROCESS OF REMOVING IRON IMPURITIES FROM ORES

FIELD OF THE INVENTION

The present invention refers to a process of removing iron impurities from ores and, more particularly, it is related to the removal of difficultly separable staining iron impurities from particles of ore, particularly silica sand.

BACKGROUND OF THE INVENTION

It is a well known fact that all the industrial processes used nowadays for removing iron impurities from ores and particularly for removing iron impurities from silica sand, particularly when silica sand is to be used for glass manufacture, derive from a very well known and old concept which comprises transforming the iron oxide and other iron insoluble impurities, into soluble iron salts, and that this solubilization of the iron impurities has always been effected by treatment with a chemical agent, sulfuric acid being the preferred chemical agent in the so called SAT (Sulfuric Acid Treatment), which is widely used in all the modern installations for treating silica sand to be used for the manufacture of glass.

Thus, for example, Knowles et al, in U.S. Pat. No. 2,306,021, describe the said principle for the first time, in their application dated 1940, and describe a process of removing iron oxide from natural silicon dioxide sand, which includes converting the iron oxide into a soluble iron salt by the action of an acid solution containing sulfuric acid and sodium chloride.

One other achievement in the art is the process described and claimed by Adams et al in U.S. Pat. No. 2,891,844, wherein the purification of silica sands is accomplished by the reduction of the surface iron oxide content (which stains the silica sand particles and is difficultly releasable therefrom), which reduction is achieved only by up to about 15% of the total iron oxide content, and comprises subjecting the sand to treatment with a hot aqueous solution containing sulfuric acid and a soluble inorganic chloride, said process being carried out in the presence of metallic copper having a large surface area so as to give an ample metallic surface contact for the sand and the solution during the purification treatment.

In turn, Slade et al, in U.S. Pat. No. 3,914,385, describe a process for purifying contaminated sand, which comprises firstly removing by froth flotation a plurality of contaminants such as the kaolin clays and siderite, then treating the resulting partially purified sand with sulfuric acid for a time and at a temperature sufficient to reduce the iron oxide content thereof, and finally filtering the aqueous sulfuric acid leach liquor from the sand and drying the sand.

These processes, however, have proven to be absolutely uncapable of removing the strongly adhered stains of iron impurities in certain mineral ores, particularly in certain types of sand, whereby it has been materially impossible to obtain sufficiently pure minerals to be used for certain purposes, whereby this type of processes have been used only to partially purify said minerals, without accomplishing a purification sufficiently high for certain special uses of said ores.

In an attempt to solve the above mentioned problem, other workers have proposed certain processes which supposedly increase the degree of purification of the ores from iron impurities, and thus, Sturgeon et al in U.S. Pat. No. 2,592,973, suggest a process for reducing iron impurities in minerals which consists in treating the minerals with an aqueous solution which is free from fluorine ions and oxalic acid but in which the dissolved constituents consist essentially of metallic salts, one of which is selected from titanous sulphate and titanous chloride and one other is selected from sodium sulfate and sodium chloride, and recovering the purified mineral product.

To the knowledge of applicant, this process never resulted in a complete purification of the mineral ores and, on the other hand, the use of titanium salts renders this process absolutely uneconomical, particularly for purifying sand which is a low economical density product, that is, has a relatively low price, and for which titanium compounds are not justifiable. Therefore, this process has been disregarded for any commercial exploitation, in view of its relatively high cost and poor economical results.

One other suggested process is the process of Gross, described in U.S. Pat. No. 2,952,516, which discloses removing iron from silica sand by the steps of adding hydrochloric acid and fluosilicic acid as such to said sand to form an aqueous slurry, separating the sand from the liquid and subsequently washing the sand with water until substantially free of acid. This process, while removing efficiently the iron stains, has the disadvantage that the combination of hydrochloric and fluosilicic acids dissolves to a great extent the silica particles and, therefore, the loss of wanted mineral with the unwanted impurities is so great that this process must also be regarded as absolutely uneconomical and of not practical use whatsoever.

Chubb, in U.S. Pat. No. 3,297,402, in turn, discloses a method of decreasing the quantity of iron sulfide contaminants in silica sand, which comprises the step of leaching the sand with a hypochlorite, but this process is restricted only to remove iron sulfides and not iron oxide, and it is a well known fact that the main contaminant of mineral ores and particularly of silica sand, are iron oxides. Therefore, this process must be discarded as an efficient process for purifying sand, particularly when the latter is to be used for the manufacture of glass.

One other process is described by Segrove in U.S. Pat. No. 3,050,364, and comprises contacting the sand, particularly when the latter is to be used for glass making, at a temperature below 250° C. and in the dry state, with substantially dry gaseous hydrogen chloride until change in color of the sand grains substantially ceases, which indicates that the reaction is substantially complete between the hydrogen chloride and the iron impurities, and then the sand is washed with water to remove the solubilized impurities. While this process might be regarded as an efficient process for removing iron stains from particles of silica sand, it is also highly inconvenient, mainly in view of the following facts: firstly, the dry hydrogen chloride tends to react with the silica particles and therefore partially dissolves the same when the sand is washed with water and, secondly and more important, it requires of very complex installations which must be made of a gas-proof material and must be capable of handling gaseous hydrogen chloride in the dry state, and no doubt this fact complicates the erection of a plant and increases the cost of the process so greatly, that the same may not be regarded as a practical method for purifying mineral ores and particularly sand for glass making purposes.

Finally, Bowdish, in U.S. Pat. No. 4,042,671, proposes and describes a special leaching method for purifying sand and other particulate materials, which comprises leaching iron and other metallic compounds from sand by a series of aqueous solutions of differing compositions, differing in concentrations of leaching component in the form of an acid, and in which the aqueous solutions are fed to the top of the mass of the sand and are permitted to drain through gravitationally with appropriate periods of time between solutions for reaction, said solutions of differing compositions forming series which begin with solutions low in concentration of the leaching component and continue with solutions of higher concentration thereof until the solution of highest strength has been reached at about midway, and then reversing the order by reducing the concentration of the solutions until water is reached. This method is extremely complicated to be controlled adequately and has not proven to give any better results than the common process used presently in all the practical commercial installations for purifying sands, whereby said process has not gained sufficient popularity in view of its uneconomical characteristics.

The modern industrial plants for purifying silica sand, have acquired a technology derived from the accomplishments of the above workers, inter alia, and have developed the very well known process of purifying silica sand which essentially comprises grinding the sand or ore, washing and desliming the ground ore to remove the major part of the clay-type binder, attrition-scrubbing the deslimed particles to release further amounts of binder therefrom, washing and desliming to remove said binder, then treating the particles in suspension with sulfuric acid in order to convert the iron impurities into water soluble iron compounds, and finally washing and desliming with water the chemically treated particles in order to remove as much as possible of the iron impurities from the ore. However, while this process has proven to be the best of all the above described processes, it still has the enormous disadvantage that it is absolutely unable to remove and release from the ore particles (particularly sand) the iron impurities which are in the form of strongly adhered stains on each individual particle, and therefore the sand or other ore obtained by this process, cannot be regarded as a highly purified ore, because said strongly adhered stains of impurities resist the chemical treatment and are not released from the individual particles by said chemical treatment followed by the washing and desliming operations.

Therefore, all the prior art processes for removing iron impurities which are in the form of strongly adhered stains on particles of ore, have proven to be absolutely unable to accomplish this goal, with the consequent disadvantages and problems caused to the plants which use this ores as starting materials for carrying out other production operations.

BRIEF SUMMARY OF THE INVENTION

Having in mind the defects of the prior art processes for removing iron impurities from mineral ores, it is an object to the present invention to provide an improved process of removing iron impurities from ores, which will be capable of removing the impurities which are in the form of heavily adhered stains on the individual particles of ore.

It is another object of the present invention to provide a process of the above mentioned character, which will be highly economical and easy to be carried out, and yet highly efficient to remove staining impurities from individual particles of ore.

It is one more particular object of the present invention to provide a process of the above mentioned character, which will be fully capable of removing practically the total amount of impurities of iron contained in a silica sand, even those which are in the form of strongly adhered stains on the individual particles of said sand.

It is another object of the present invention to provide a process of the above mentioned character, which will produce a sand of a quality sufficient to manufacture a high quality glass.

One additional and more important object of the present invention is to provide a process for purifying silica sand from iron impurities which stain the individual particles of sand, which will not require modifications in the plants for chemically treating the sand and will instead be capable of being carried out in said conventional plants.

The foregoing objects and other ancillary thereto are preferably accomplished as follows:

According to a preferred embodiment of the present invention, the process for removing iron impurities from ores, particularly useful for removing stains of iron impurities adhered to silica sand particles, comprises grinding the ore, washing and desliming the ground ore to remove the major part of the clay-type binder, attrition-scrubbing the deslimed particles to release further amounts of binder therefrom, washing and desliming to remove said binder, drying and heating the ore particles, treating the hot particles with a chemical agent suitable to convert the iron impurities into water soluble iron compounds, attrition-scrubbing the hot suspension of chemically treated particles to release the stains of iron impurities, and washing with cold water and desliming to recover the purified ore particles.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment when read in connection with the accompanying drawing, in which:

The single FIGURE is a flow sheet illustrating the steps followed in the process of the present invention, for purifying sand from the iron impurities contaminating the same.

DETAILED DESCRIPTION

While in the accompanying drawing and in the detailed description that follows, the process of the present invention will be described and illustrated as applied to the purification of silica sand from the staining iron impurities contained thereby, it will be clearly apparent to anyone skilled in the art that the present process is not restricted to such purification of silica sand but that, instead, said process may be applicable to the purification of any other type of mineral ore, containing impurities which stain the particles thereof, and therefore it is to be understood that it is not desired to restrict this invention to said illustrative embodiment which will be described hereinbelow.

Having now more particular reference to the drawing, there is shown a process according to the present invention, for the purification of silica sand from the iron impurities that stain the individual particles thereof, and which comprises feeding the sandstone as extracted from the place of beneficiation, illustrated by means of the pile 1, by means of any suitable conveyor 2, into a grinder or crusher 3, in order to uniformly reduce the particle size of the mineral ore, such that the further treatment be effected with more efficiency. From the grinder 3, the ground ore is passed by means of any suitable elevator or conveyor 4, into the washer 5, wherein the mineral ore is washed with water in order to form a suspension of clay-binder material which is extracted through line 6, whereas the heavier silica sand particles with the remaining adhered clay-binder, is passed through line 7 in the form of a heavy water suspension, into an attrition-scrubber 8, wherein the sand particles in suspension are forced to be rubbed against each other, in order to release the clay type binder for further removal thereof. Of course it will be obvious to any one skilled in the art that this combination of steps of washing and attrition-scrubbing, may be repeated several times in accordance with the needs, three of said repeated steps being normally used in plants for purifying silica sand.

The particulate attrition-scrubbed material is fed to the deslimer 9, in order to remove the binder from the sand particles, which are transported to a suitable storage means 10, from which the moist particles are fed by means of a suitable conveyor 11 to a dryer 12, wherein said particles are dried and heated to a temperature of from about 100° to 250° C., preferably of from about 150° to 200° C., to be introduced at this temperature into reactor 13 which has means 14 for maintaining the temperature of the reaction mixture.

In the reactor 13, a chemical treatment solution is fed from tank 15, in order to react with the iron impurities of the sand particles contained in the reactor 13, said chemical agent being capable of converting the insoluble iron impurities, such as iron oxides and silicates, into soluble ferrous salts, in order to enable further removal thereof from the sand particles.

As preferred chemical agents, concentrated sulfuric acid, 35% hydrogen chloride solution or 50% caustic soda solution are generally used, and an amount of from 10 to 70 kg. of said chemical agent per ton of ore and an amount of 20 to 100 kgs. of water per ton of said ore are simultaneously introduced into the reactor 13, in order to chemically treat the sand for a period of time of from 5 to 45 minutes, preferably from 10 to 30 minutes, in order to fully convert said insoluble iron compounds into soluble iron compounds.

After the chemical attack in reactor 13, the hot suspension is poured into the attrition-scrubber 16, wherein the suspension is treated at a 65 to 80% solid content and for a period of time of from about 1 to about 10 minutes, in order to fully release the stains of impurities from the sand particles.

From the attrition-scrubber 16, the suspension is passed to a washer 17 wherein said suspension is washed with cold water, the removed impurities being extracted through line 18, whereas the heavy suspension of purified sand is sent through line 19 into a deslimer 20 for further separation of the impurities through line 21, the fully purified sand being sent to a storage space 22.

The above specifications may of course be varied as it may be clearly apparent to any one skilled in the art, depending on the grain size conditions of the sand and on the amount of ferrous stain existing on the particles thereof, as well as on the cost of the ore.

The present invention will be more clearly understood by having reference to the following examples which are given to furtherly illustrate the invention without however restricting the same in any respect.

EXAMPLE 1

A sandstone extracted from the North of Mexico, from the region of Carrizo, and containing ferrous and aluminous impurities in the order of 0.20% $Fe_2O_3$ and 0.80% of $Al_2O_3$, was treated by the method of the present invention, with sulfuric acid, hydrochloric acid and sodium hydroxide, in accordance with the first column of Table 1 below:

The sandstone had been previously ground to −60 Tyler mesh and deslimed and attritioned in order to remove as much as possible of the clay-binder in accordance with the above described process.

Parallel tests were made with and without attrition after the chemical attack in order to compare the process of the instant invention against the process of the prior art and the results are given in Table I hereinbelow:

TABLE I

| Treatment | Attrition after chemical attack | % $Fe_2O_3$ |
| --- | --- | --- |
| 15K/T $H_2SO_4$ | | |
| 52.5K/T $H_2O$ | | |
| Attack at 150° C. | NO | 0.128 |
| for 10 minutes | YES | 0.104 |
| 27K/T 35% HCl | | |
| Attack at 150° C. | NO | 0.176 |
| for 10 minutes | YES | 0.150 |
| 66K/T 50% NaOH | | |
| Attack at 200° C. | NO | 0.142 |
| for 30 minutes | YES | 0.128 |

NOTE: The attrition was effected at a 75% solids content for a period of time of 3 minutes.

EXAMPLE 2

Another sandstone similar to the above sandstone described in Example 1, but obtained from the State of Veracruz, Mexico, was processed in the following manner:

The sandstone from the mine was attritioned in order to remove as much as possible of the kaolin clay contaminating the same as a binder. Thereafter the deslimed material was conditioned with a petroleum sulfonate and a polyalcohol in an acid medium in order to remove by froth flotation other ferrous contaminants such as ilmenite, magnetite, hematite, rutyl, leucogen and zircon.

Thereafter, the material was subjected to a chemical attack followed or not by an attrition, in accordance with the process of the present invention and the results obtained from said sandstone were as indicated in Table II hereinbelow.

TABLE II

| Treatment | Attrition | % $Fe_2O_3$ |
| --- | --- | --- |
| After attrition | | 0.152 |
| After flotation | | 0.050 |
| Sulfuric acid | | |
| attack | NO | 0.012 |
| 30K/T 150° C., 10 min. | YES | 0.006 |

TABLE II-continued

| Treatment | Attrition | % Fe$_2$O$_3$ |
|---|---|---|
| 35% HCl Attack | NO | 0.020 |
| 65K/T 150° C., 10 min. | YES | 0.010 |
| 50% NaOH Attack | NO | 0.034 |
| 66K/T 200° C., 30 min. | YES | 0.024 |

NOTE: The attrition was carried out under the same conditions as for Example 1 above.

It may be seen from the above examples that the obtainable reductions of the iron impurities content of the treated mineral ores were remarkably higher than those of the prior art processes in which no attrition step is used, whereby for the first time a highly efficient process, which does not require drastic modification in the purifying plants existing in the industry in general, may accomplish a more complete purification of iron impurified ores, which is remarkably more efficient than the prior art processes.

Although certain specific embodiments of the present invention have been shown and described in the above, it is to be understood that many modifications thereof are possible. The present invention, therefore, is not to be restricted insofar as is necessitated by the prior art and by the spirit of the appended claims.

What is claimed is:

1. A process of removing iron impurities from ores comprising grinding the ore, washing and desliming the ground ore to remove the major part of the clay-type binder, attrition-scrubbing the deslimed particles to release further amounts of binder therefrom, washing and desliming to remove said binder, drying and heating the ore particles, treating the hot particles with a chemical agent suitable to convert the iron impurities into water soluble iron compounds, attrition-scrubbing the hot suspension of chemically treated particles to release the stains of iron impurities thereby forming a hot suspension of the chemically treated particles in said treating agent, and washing with cold water and desliming to recover the purified ore particles.

2. A process according to claim 1 wherein said ore from which the iron impurities are to be removed is sandstone.

3. A process according to claim 2 wherein said chemical agent suitable to convert the iron impurities into water soluble iron compounds is concentrated sulfuric acid.

4. A process according to claim 2 wherein said chemical agent suitable to conver the iron impurities into water soluble iron compounds is 35% hydrochloric acid.

5. A process according to claim 2 wherein said chemical agent suitable to convert the iron impurities into water soluble iron compounds is 50% caustic soda solution.

6. A process according to claim 1 wherein said hot particles treated with said chemical agent are at a temperature of from about 100° to about 250° C., preferably of from 150° to 250° C.

7. A process according to claim 6 wherein said hot particles are treated with said chemical agent for a period of time of from 5 to 45 minutes.

8. A process according to claim 1 wherein said attrition-scrubbing of the hot suspension of chemically treated particles is effected at a solids content of from 65% to 80% and for a period of time of from 1 to 10 minutes.

* * * * *